United States Patent Office 2,918,466
Patented Dec. 22, 1959

2,918,466

ANTIMICROBIAL CHEMICAL COMPOUNDS DERIVED FROM ALKOXYPHENYL GLYCIDIC ACID

Frank J. Kreysa, Queens Village, N.Y., assignor to St. John's University, Brooklyn, N.Y.

No Drawing. Application May 24, 1955
Serial No. 510,873

9 Claims. (Cl. 260—247.2)

This invention relates to new and useful anti-microbial agents, and more particularly to chemical compounds of the type 3-(substituted phenyl) N-2' (hydroxyethyl) serine or isoserine derivatives.

In recent years, considerable advances have been made in the development of antibiotics useful in combating pathogenic microorganisms, particularly fungi and protozoa. However, in spite of present extensive chemical knowledge, little progress has been made in discovering or synthesizing chemical compounds that would be comparable in efficacy to the antibiotics produced by fermentation.

A principal object of this invention is to produce by chemical reactions compounds which inhibit the growth of pathogenic organisms such as fungi and protozoa.

Another important object is to make available by synthesis families of chemical compounds effective in combatting microrganisms.

I have synthesized new chemical compounds of the group consisting of 3-(substituted phenyl) N-(2' hydroxyethyl) amino hydroxy propionic acid, its salts, esters, amide and substituted amides, and the corresponding morpholine derivatives obtained by dehydrating the enumerated compounds. The general structural representation of the new chemical compounds is:

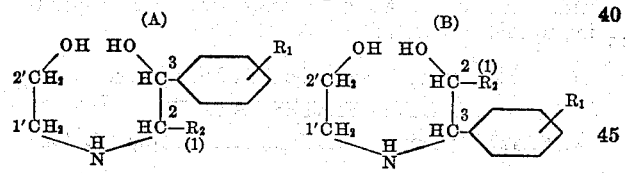

corresponding morpholine derivatives

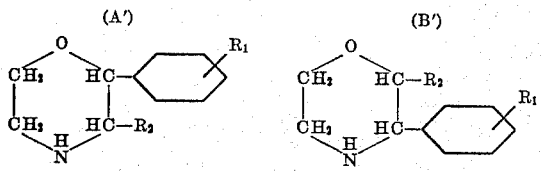

where $R_1$ is hydrogen, alkyl, alkoxy, halogen or nitro group and $R_2$ is carboxy, metal carboxy, carbalkoxy, amide or substituted amide.

The preferred chemical compounds of this invention are those in which the substituted phenyl group is a p-substituted phenyl such as p-methoxyphenyl.

I have discovered that these chemical compounds are especially useful in combatting pathogenic organisms, particularly fungi and protozoa.

The chemical compounds of this invention may be prepared by reacting epoxides, such as the 3-substituted phenyl glycidic esters:

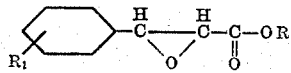

or their corresponding alkali metal salts:

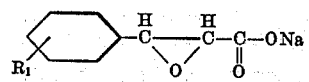

with ethanolamine whereby the oxirane ring is opened and compounds of Formulae A and B shown hereinabove are obtained. When desired, these chemical compounds may be dehydrated in the usual manner to yield the corresponding morpholine derivatives, A' and B'.

The following illustrative examples will further clarify the invention.

*Example 1*

Eight parts by weight of p-methoxy cinnamic aldehyde (boiling point 175–185° C. at 10 mm. Hg; melting point 58–60° C.) dissolved in 16 parts by weight of 95% ethanol was placed in a vessel equipped with a thermometer and a mechanical stirrer. Then 13.5 parts by weight of 30% hydrogen peroxide (Superoxol) was added and this was followed by the addition of 8 parts by weight of 25% sodium hydroxide solution. The temperature was kept below 50° C. by outside cooling. The resulting two-layer mixture was evaporated at low temperature to a small volume, water was added, and the mixture was extracted with ether. The aqueous residue was evaporated to dryness on a water bath and washed with absolute ethanol.

The thus obtained sodium salt of substituted glycidic acid was heated with ethanolamine for several hours on a water bath in the weight proportions of 1.08 parts of sodium salt and 0.66 part of ethanolamine. The excess ethanolamine was removed under vacuum.

The chemical compound thus produced was the sodium salt of 3 (p-methoxyphenyl) N-(2' hydroxyethyl) serine or isoserine, structurally represented as:

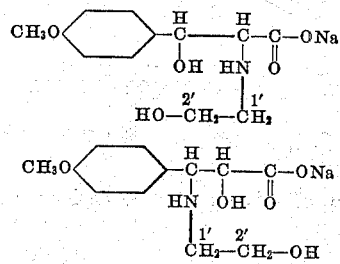

This chemical product inhibited the growth of *Trichomonas vaginalis* in vitro, using simplified trypticase medium (Kupferberg, Johnson and Sprince, Proc. Soc. Exptl. Biol. Med. 67, 304, 1948), as is evident herebelow:

| Product Dilution | Percent Inhibition [1] of *Trichomonas vaginalis* |
|---|---|
| 1:1,000 | 100%. |
| 1:10,000 | 90%. |
| 1:100,000 | Approximately 50%. |

[1] Determined by microscopic count of viable organism.

*Example 2*

To 1.22 parts by weight of ethanolamine containing about 5% of water, 2.2 parts by weight of ethyl 3 (p-methoxyphenyl) glycidate was added dropwise. The mixture was then heated on a steam bath for one hour at which time solidification took place. The solid mass was recrystallized from ethyl acetate yielding white crystalline material melting at 148–150° C.

The resulting chemical compound was 3 (p-methoxyphenyl) N-(2' hydroxyethyl) N'-2'' hydroxyethyl) serine or isoserine amide of the following formula:

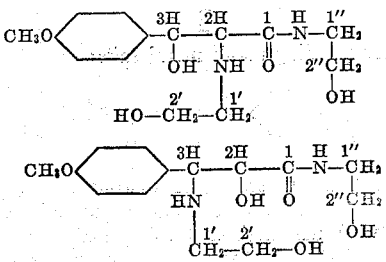

The chemical compound was effective in inhibiting the growth of *Trichomonas vaginalis* when used in appreciably higher concentrations than those in Example 1.

*Example 3*

One-half part by weight of the chemical product of Example 2 in 10 parts by weight of absolute ethanol was mixed with 10 parts by weight of dry ethanolic hydrogen chloride and 25 parts by weight of sodium dried benzene. Water and excess solvents were removed from the reaction mixture by azeotropic distillation and the residue was heated to 75° C. under 10 mm. Hg vacuum for 30 minutes.

The viscous residue was dissolved in water, made alkaline with 2 parts by weight of 20% sodium hydroxide solution and extracted with 5 parts by weight of chloroform. The dry chloroform extract was evaporated to dryness under reduced pressure. The white residue was crystallized from ethyl acetate and had a melting point of 130–131° C.

The crystalline product was 2(3)(p-methoxyphenyl) 3(2) N-(2' hydroxyethyl) morpholine carbamide of the following formula:

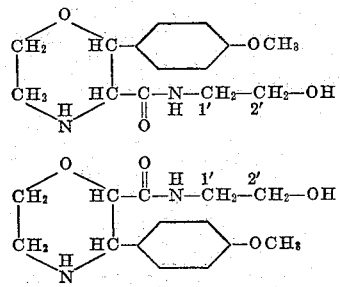

The efficacy of this morpholine derivative in inhibiting the growth of *Trichomonas vaginalis* was very similar to that of the chemical compound of Example 2.

Resort may be had to such modifications and equivalents as fall within the spirit of the invention and the scope of the appended claims.

What I claim is:

1. The new chemical product made by reacting ethanolamine with a chemical reagent selected from the group consisting of 3 (p-methoxyphenyl) glycidic acid, its alkali metal salts and ethyl ester at a temperature causing the oxirane ring of said chemical reagent to open.

2. The new chemical product of claim 1 wherein the selected chemical reagent is an alkali metal salt of 3 (p-methoxyphenyl) glycidic acid.

3. The new chemical product of claim 1 wherein the selected chemical reagent is ethyl 3 (p-methoxyphenyl) glycidate.

4. The morpholine product obtained by dehydration of the chemical product of claim 3.

5. The chemical process which comprises mixing ethanolamine and an alkali metal salt of 3 (p-methoxyphenyl) glycidic acid and heating the resulting mixture to open the oxirane ring of said glycidic acid salt by reaction with ethanolamine, thereby yielding an ethanolamine condensation product of said glycidic acid salt.

6. The process of claim 5 wherein the alkali metal salt is the sodium salt.

7. The chemical process which comprises reacting ethanolamine with a chemical reagent selected from the group consisting of 3 (p-methoxyphenyl) glycidic acid, its alkali metal salts and ethyl ester at a temperature causing the oxirane ring of said chemical reagent to open, and separating the reaction product from unreacted ethanolamine and reagent.

8. The process of claim 5 wherein the ethanolamine condensation product is dehydrated to form the corresponding morpholine derivative.

9. The process of claim 5 wherein the ethanolamine condensation product by admixture with hydrogen chloride is converted to the hydrochloride, said hydrochloride is azeotropically distilled with absolute ethanol and benzene, and the resulting hydrochloride is treated with alkali to free a morpholine derivative corresponding to said ethanolamine condensation product.

References Cited in the file of this patent

UNITED STATES PATENTS 1,859,527    Payman _____ May 24, 1932